Patented Apr. 29, 1952

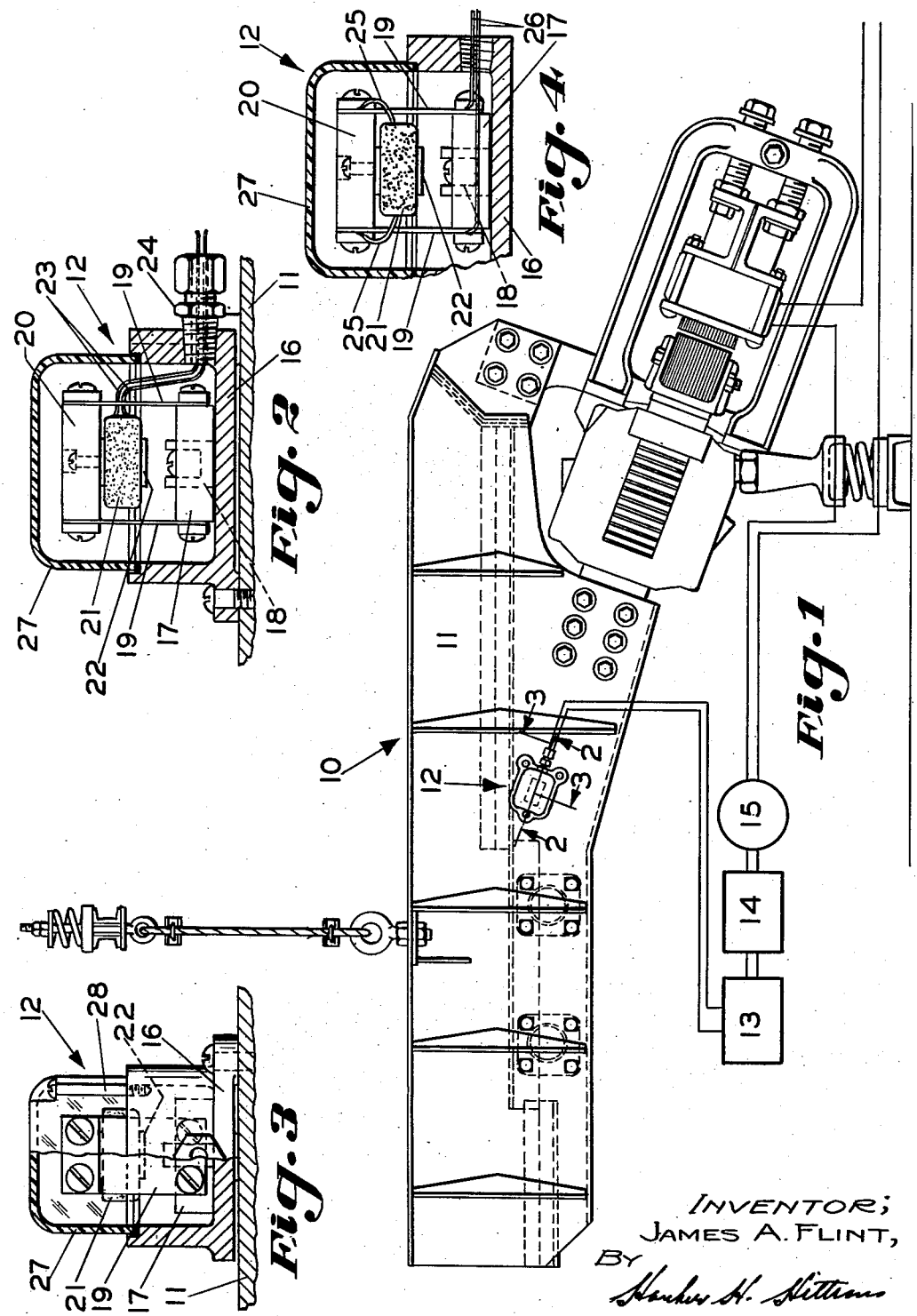

2,595,067

UNITED STATES PATENT OFFICE 2,595,067

INERTIA TYPE VIBRATORY PICKUP

James A. Flint, Bexley, Ohio, assignor to The Jeffrey Manufacturing Company, a corporation of Ohio Application February 23, 1950, Serial No. 145,665

1 Claim. (Cl. 171—209)

This invention relates to a vibratory pick-up, and an object of the invention is to provide such a device which will develop a voltage proportional to the amplitude of vibration of the vibratory member to which it is attached, the pick-up including improved mechanism wherein there is a base which is attached to vibrate with a vibrating member, which base supports a vibratory mass on a pair of spaced cantilever springs, the planes of which are at right angles to the amplitude of vibration of the base and to the vibrating member and in which the spaced mass or weight constitutes a reaction or inertia weight or mass which has little or no significant vibration during the operation of the member, the reaction or inertia weight in the preferred arrangement carrying an operating coil, and the base carrying a cooperating magnet to develop a voltage in the coil proportional to the amplitude of vibration of said base and member to which it is attached.

A further and more specific object of the invention is to provide apparatus of the above mentioned type in which conductors leading to the coil carried by the reaction or inertia weight or mass includes leaf spring supporting cantilevers.

Other objects of the invention will appear hereinafter, the novel features and combinations being set forth in the appended claim.

In the accompanying drawings:

Fig. 1 is a side elevational view of a vibratory feeder showing one form of apparatus to which the inertia pick-up device of my invention is particularly applicable and illustrating one of the pick-up devices attached to the deck thereof;

Fig. 2 is a sectional view taken on the line 2—2 of Fig. 1, showing a sectional elevational view of one form of inertia pick-up incorporating the features of my invention;

Fig. 3 is a combined sectional and elevational end view of the pick-up of Fig. 2; and Fig. 4 is a view generally similar to Fig. 2, showing a modified form of pick-up incorporating features of my invention.

In Fig. 1 of the drawings there is illustrated a vibratory electro-magnetic feeder 10 which may in general follow the construction disclosed in my Patent No. 2,251,586, entitled Vibratory Feeder and Screen, dated August 5, 1941, which includes a deck 11, the amplitude of vibration of which may be measured and controlled by apparatus involving a pick-up device 12 which is the subject-matter of this invention. The pick-up device 12 is constructed so as to develop a voltage substantially directly proportional to the amplitude of vibration of the deck 11, which voltage is amplified by an amplifier 13 and employed to operate control mechanism 14 which in turn controls a motor driven rheostat 15 to maintain the amplitude of vibration of the deck 11 at any desired value. The control system may be of any desired type. For example, it may follow in general that disclosed in the patent to Lee P. Doyle, No. 2,273,912, entitled Vibratory Conveyor or Motor and Means for Controlling Same, dated February 24, 1942.

Two embodiments of the magnetic pick-up are illustrated, one in Figs. 2 and 3 the other in Fig. 4, but they are similar in substantially all respects except one, and thus except for differences indicated it will be understood that the description is common to the two embodiments.

Said pick-up device 12 includes a base 16 which has a flat bottom and a continuous general oval shaped upstanding wall forming a receiving cup. The base 16 is adapted to be rigidly attached to the deck 11 so as to partake of the vibration thereof along an axis. Rigidly attached to said base 16 and, in fact, forming a part thereof is an insulating base block 17, of fiber or the like, at the center of which there is a permanent magnet 18 having the opposite pole faces spaced apart and extending upwardly and lying in a plane which is parallel with the plane of the base 16 and parallel with the axis of vibration of the deck 11, the amplitude of which is to be measured.

Extending upwardly from opposite ends of the block 17 is a pair of spaced cantilever metal leaf springs 19 which are in planes that are spaced apart along the axis of vibration of the base 16, said planes being at right angles to the plane of said base 16. In other words, the planes of the two spaced-apart leaf springs 19 are perpendicular to the plane of vibration of the pick-up device and of the member 11, the amplitude of vibration of which is to be measured and they intersect this axis or plane of vibration at right angles.

At their upper ends the leaf springs 19 resiliently support an inertia block 20 formed of insulating material, such as fiber. The opposite ends of the leaf springs 19 are removably attached to the blocks 17 and 20, as clearly illustrated in the drawings, by clamping plates and associated screws. At the center of the inertia block 20 and depending therefrom is a coil assembly 21 including a coil, preferably of a great many turns of relatively fine wire, mounted on a core 22 of magnetic material, said core 22 preferably being laminated.

As illustrated in Fig. 2 of the drawings, conductors or leads 23 extend from the coil 21 to a conduit held to the base 16 by an appropriate fitting 24. In the construction of Fig. 4, leads 25 from the coil 21 extend one to each of the spaced leaf springs 19 which act as conductors to extend the electrical circuit to the bottoms of the leaf springs 19, to which conductors 26 are connected, further extending the electrical circuit from said coil 21. The arrangement of Fig. 4 is generally preferred since it eliminates any vibrating conductors between the coil 21 and the base 16.

The complete operating mechanism is enclosed within a casing or housing provided by the cup like base 16 and a removable cap 27 which may be of transparent flexible material and which is removably attached to the base 16 by a plurality of corner screws 28.

From the above description it will be seen that the base 16 and those parts rigidly attached to it, including the block 17 and the permanent magnet 18, partake of the full vibratory motion of the deck 11 as representative of a vibrating object, the amplitude of which is to be measured and/or controlled. Spaced from this vibratory assembly there is an inertia assembly comprising the block 20, coil 21 and core 22 and any parts rigidly attached to any of them. The parallel face of the core 22 is spaced from and parallel with the pole faces of the permanent magnet 18 and is subject to the influence of the magnetic field developed thereby. As a consequence the voltage developed in the coil 21 will be substantially proportional to its amplitude of vibration involving the well known generator principle.

The inertia weight or mass 20—22 is carried upon relatively weak leaf spring cantilevers, the planes of which are perpendicular to the axis of vibration of the base 16.

The mechanical arrangement above described is generally of importance, together with certain other characteristics, one of which is the natural period of vibration of the vibratory system comprising particularly the inertia or reaction weight or mass 20—22 and the cantilever springs 19 upon which it is supported. The natural period of vibration of this vibratory system is preferably very low, as compared with the frequency of vibration of the device to which it is to be attached, the amplitude of which is to be measured. For example, many vibratory feeders are designed to operate at 3600 vibrations per minute. The natural period of vibration of the inertia mass system should only be a small fraction of this, such as less than 50%. From a practical standpoint, it is desirable in some cases to build these units with a natural period of vibration of the order of 10 to 20% of the highest frequency of any device to which they may be attached, to take care of those cases where they are attached to devices having an appreciably lower frequency. For example, in one practical device the natural period of the inertia mass system 19—22 may be of the order of 400 cycles. Such a pick-up device is quite satisfactory to be used in connection with vibrators having an operating frequency as high as 7200 vibrations per minute or as low as 1200 vibrations per minute.

In both illustrated embodiments of the invention the coil 21 is a part of the inertia mass 20—22 and the magnet 18 is carried by the base block 17. This is the preferred arrangement, though a reverse condition could exist. The reason it is the preferred arrangement is because of the fact that in operation the base block 17 partakes of the full vibration of the deck 11, while the inertia mass 20—22 remains stationary or substantially so during operation. As a matter of fact, from observation of one of these units under the stroboscope it is amazing what little vibration actually exists in the inertia mass 20—22. In one instance, where it was observed in operation under a stroboscope while attached to a feeder vibrating at 3600 vibrations per minute, with the deck 11 and base 16 vibrating at one-sixteenth of an inch, it was impossible to see any vibration whatever in the inertia mass 20—22 with a naked eye. In other words, for all practical purposes the inertia mass 20—22 stands still and the base 16, block 17 and magnet 18 vibrate relative to this substantially stationary inertia mass 20—22.

Thus, attaching the coil to the substantially stationary portion of the pick-up means that it is not subject to any appreciable vibration during operation which greatly increases its life over what it would be if it were subjected to the full vibration of the deck 11 or a substantial part thereof. In other words, it is not necessary to make a special shock-proof coil 21 but a relatively inexpensive commercially available coil may be employed with this arrangement.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

An inertia type magnetic pick-up for use in measuring the amplitude of vibration of a member vibrating along an axis by being vibrated along said axis including a base block of electrical insulating material, means for mounting said base block on said member, a permanent magnet in the center of said insulating block having opposite pole faces facing outwardly from said base block and lying in planes extending parallel to said axis of vibration, a pair of electrically conductive cantilever leaf springs spaced one at each of opposite sides of said insulating base block, means mounting one end of each of said springs to said insulating base block, said springs extending in planes spaced apart along said axis of vibration and intersecting it at right angles, an inertia block of electrical insulating material spaced from said base block of insulating material and positioned between the ends of said springs opposite said base block, means connecting said opposite ends of said springs to said inertia block, a coil assembly, means mounting said coil assembly upon said inertia block whereby the weight of said coil assembly is added to that of said inertia block and with said coil assembly between said inertia block and said base block, said coil assembly including a coil having two electrical conductors leading therefrom one to each of said leaf springs, and a core of magnetic material, said core being spaced from said permanent magnet whereby when said base is vibrated along said axis of vibration an electrical voltage is generated in said coil, and an electrical conductor connector means associated with each of said leaf springs adjacent said base block of insulating material.

JAMES A. FLINT.

REFERENCES CITED

The following references are of record in the file of this patent:

UNITED STATES PATENTS

| Number | Name | Date |
| --- | --- | --- |
| 2,111,643 | Salvatori | Mar. 22, 1938 |
| 2,167,078 | Lakatos | July 25, 1939 |
| 2,303,413 | Washburn | Dec. 1, 1942 |
| 2,359,245 | Ritzmann | Sept. 26, 1944 |
| 2,363,303 | Ehrgott et al. | Nov. 21, 1944 |
| 2,540,796 | Stanton | Feb. 6, 1951 |